US007485039B2

(12) United States Patent
Okada

(10) Patent No.: US 7,485,039 B2
(45) Date of Patent: Feb. 3, 2009

(54) GAMING MACHINE

(75) Inventor: Kazuo Okada, Tokyo (JP)

(73) Assignee: Aruze Corp., Tokyo (JP)

( * ) Notice: Subject to any disclaimer, the term of this patent is extended or adjusted under 35 U.S.C. 154(b) by 745 days.

(21) Appl. No.: 10/697,261

(22) Filed: Oct. 31, 2003

(65) Prior Publication Data

US 2004/0166927 A1 Aug. 26, 2004

(30) Foreign Application Priority Data

Jan. 10, 2003 (JP) ............................ 2003-005139

(51) Int. Cl.
*A63F 9/24* (2006.01)
*A63F 13/00* (2006.01)
*A63F 3/08* (2006.01)

(52) U.S. Cl. ............................ 463/20; 463/16; 463/30; 463/34; 463/46; 273/274; 273/138.1

(58) Field of Classification Search ............ 463/16–20, 463/30–34, 46; 273/138.1, 274
See application file for complete search history.

(56) References Cited

U.S. PATENT DOCUMENTS

| | | | | |
|---|---|---|---|---|
| 6,517,433 | B2 * | 2/2003 | Loose et al. | 463/20 |
| 6,817,946 | B2 * | 11/2004 | Motegi et al. | 463/31 |
| 6,905,406 | B2 * | 6/2005 | Kaminkow et al. | 463/20 |
| 7,160,187 | B2 * | 1/2007 | Loose et al. | 463/20 |
| 2003/0087690 | A1 | 5/2003 | Loose et al | |
| 2003/0234489 | A1 | 12/2003 | Okada | |
| 2005/0192090 | A1 * | 9/2005 | Muir et al. | 463/30 |
| 2007/0202948 | A1 * | 8/2007 | Muir et al. | 463/31 |

FOREIGN PATENT DOCUMENTS

| | | | |
|---|---|---|---|
| JP | 07-124290 | A | 6/1995 |
| JP | 10-328357 | A1 | 12/1998 |
| JP | 2000-300715 | A | 10/2000 |
| JP | 2001-087458 | A | 4/2001 |
| JP | 2001-170244 | A | 6/2001 |

OTHER PUBLICATIONS

European Search Report Dated Sep. 16, 2004.
JPO Office Action-Translation of Notification of Reasons for Refusal, Ref. No. P02-1029, Dispatch No. 071378, Feb. 20, 2007 (3 pages).
PRCPO, Notification of the First Office Action with English translation, App. No. 2004100294637, Feb. 22, 2008 (8 pages).

* cited by examiner

*Primary Examiner*—Robert E Pezzuto
*Assistant Examiner*—Sunit Pandya
(74) *Attorney, Agent, or Firm*—Rader, Fishman & Grauer, PLLC

(57) ABSTRACT

A gaming machine comprises a cabinet, a decoration panels disposed on the front of the cabinet, display windows provided on the front of the cabinet, a plurality of rotatary reels, each of which has a plurality of symbols on an outer peripheries thereof, a plurality of symbols being visible through the display windows, a light source unit for illuminating said decorate panels from the inside of said cabinet, and a reflection units for guiding the light emitted from the light source unit to illuminate the plurality of symbols.

7 Claims, 12 Drawing Sheets

GAMING MACHINE

FIELD OF TECHNOLOGY

The present invention relates to a gaming machine.

DESCRIPTION OF RELATED ART

In recent years, gaming machines such as pachinko machines and pachinko slot machines have come into fashion, and various types of gaming machines have been developed and put on the market by gaming machine manufacturers.

As a kind of such gaming machines, symbol combination type gaming machines which allow a player to make a profit according to a combination of symbols have been known up to now.

Such a symbol combination type gaming machine is started when a player inserts a gaming medium (coin, medal, or the like) into the machine, and then the control means drives and controls the variable-display device to rotate the reels so that symbols are variably displayed. The variably displayed symbols are stopped when the rotations of the reels are stopped in succession automatically or by the player's stop operation after a fixed time period. At that time, if a particular combination (winning combination) of symbols on the respective reels appears in the display window, the gaming machine gives a profit to the player by paying out gaming mediums.

As means capable of realizing such winning combinations and giving a profit to a player, for example, symbol variable-display devices called "drum-shaped symbol variable-display device" or "belt-shaped symbol variable-display device" are used.

Among these devices, for example, drum-shaped symbol variable-display devices slightly vary with target gaming machines, but are basically identical in configuration and generally accommodate three drum-shaped rotators i.e. reels arranged in parallel, which have symbols such as numbers and marks drawn on the outer peripheries thereof.

Furthermore, in addition to the reels, rotating means for rotating and stopping the reels, position determining/detecting means for determining positions where the symbols drawn on the outer peripheries of the reels are displayed stationarily, and the like constitute a drum-shaped symbol variable-display device.

It is well known that illuminating means for illuminating the symbols and decorations, which is a component of the symbol variable-display device, plays a very important role in keeping player's interest in a game.

Specifically, when a player performs a stop operation, that is, pulls a lever or pushes a button to stop the reels with good timing while seeing symbols on the reels, in order to stationarily display the symbols which would not be stationarily displayed unless the stop operation is performed with predetermined timing, it is difficult for not only a beginner player but also an advanced-level player to identify, when the outer peripheries of the reels are illuminated dimly, the symbols drawn on the outer peripheries of the reels which are rotating at high speed. It is therefore absolutely necessary to provide a means for sufficiently illuminating the symbols in order to provide gaming environment suitable for a player.

Furthermore, when the decorations of a gaming machine are illuminated with the illuminating means, the decorations further attract the player to produce decoration effects, thus further attracting the player's interest.

On the other hand, the illuminating means of a conventional symbol variable-display device comprises illuminating lamps for illuminating the decorations, and illuminating lamps for illuminating the symbols drawn on the outer peripheries of the reels, which need to be provided separately in the limited space in a gaming machine, thereby constituting a restriction on the design of the gaming machine. Furthermore, a new issue that the manufacturing cost increases as the number of parts increases has emerged. In addition, it is also considered that the number of the illuminating lamps increases and the lighting expense increases accordingly, thus straining the management of the gaming shop.

For this reason, it has been adopted to eliminate the aforementioned disadvantage by integrating the illuminating lamps for illuminating the decoration devices, and the illuminating lamps for illuminating the symbols drawn on the outer peripheries of the reels from the front of the decoration panel 13.

For example, see Japanese Patent Application KOKAI Publication No. 10-328357 (page 2 and FIG. 1).

SUMMARY OF THE INVENTION

However, even if it is possible to realize space saving by using the illuminating lamps into which illuminating lamps for illuminating the decoration devices and illuminating lamps for illuminating the symbols drawn on the outer peripheries of the reels from the front of the reels are integrated, the amount of light emitted from the illuminating lamps decreases, and consequently the symbols become illegible because of darkness. This obstructs not only a beginner player but also an advanced-level player in pulling a lever or pushing a button with good timing while seeing the symbols, and consequently there has arisen a state that the player cannot concentrate on a game.

It is therefore an object of the present invention to solve the problem that the symbols on the reels are illegible because of dimness and thereby the player is obstructed in pulling a lever or pushing a button with good timing while seeing the symbols, and to provide an environment in which the player is absorbed in a game without losing interest in the game.

In order to achieve the above object, the present invention provides a gaming machine comprising: a cabinet; a decoration panels disposed on the front of the cabinet; display windows provided on the front of said cabinet; a plurality of rotatary reels, each of which has a plurality of symbols on an outer peripheries thereof, a plurality of symbols being visible through the display windows; a light source unit for illuminating said decorate panels from the inside of said cabinet; and a reflection units for guiding the light emitted from the light source unit to illuminate said plurality of symbols.

More specifically, the present invention provides a gaming machine described below.

The gaming machine of the present invention comprises a cabinet, decoration panels provided on the front of the cabinet, display windows provided on the front of the cabinet, a plurality of rotatary reels, on the outer peripheries of which a plurality of symbols visible through the display windows are drawn, light source units for illuminating the decoration panels from the inside of the cabinet, and reflection units for guiding the light emitted from the light source units to illuminate the plurality of symbols.

According to the present invention as described above, the gaming machine of the present invention comprises a cabinet, decoration panels provided on the front of the cabinet, display windows provided on the front of the cabinet, a plurality of rotatary reels, on the outer peripheries of which a plurality of symbols visible through the display windows are drawn, light source units for illuminating the decoration panels from the inside of the cabinet, and reflection units for guiding the light emitted from the light source units to illuminate the plurality of symbols. Therefore, the light emitted from the light source units is guided to the symbols without being diffused by the reflection units, and thereby the symbols are illuminated more brightly than in a gaming machine having no reflection unit.

As a result, the present invention solves the problem that the symbols on the reels are illegible because of dimness and thereby the player is obstructed in pulling a lever or pushing a button with good timing while seeing the symbols, and to provide an environment in which the player is absorbed in a game without losing interest in the game.

Furthermore, since the light source units which have needed to be provided separately in order to illuminate different places can be used for the same purpose, the limited space in the gaming machine can be saved and the number of parts can be reduced, and thereby the manufacturing cost can be reduced.

Transparent liquid crystal devices may be provided in front of the plurality of the rotatary reels.

When the transparent liquid crystal devices are provided in front of the plurality of the rotatary reels, the light emitted from the light source units are guided to the symbols without being diffused by the reflection units, and thereby the symbols are illuminated more brightly than in a gaming machine having no reflection unit.

As a result, the present invention solves the problem that the symbols on the reels are illegible because of dimness and thereby the player is obstructed in pulling a lever or pushing a button with good timing while seeing the symbols, and to provide an environment in which the player is absorbed in a game without losing interest in the game.

Furthermore, since the light source units which have needed to be provided separately in order to illuminate different places can be used for the same purpose, the limited space in the gaming machine can be saved and the number of parts can be reduced, and thereby the manufacturing cost can be reduced.

Furthermore, in case of a gaming machine having a liquid crystal device, which is growing in demand in recent years, it is more remarkable than in a gaming machine having no liquid crystal device that the symbols are illegible. However, even if a player plays a game at such a gaming machine having a liquid crystal device, the player is able to see the symbols which are clear because of this invention, and thereby can fully enjoy the game.

This is a perspective view showing the outline of a slot machine according to the present invention.

[FIG. 2]

This is a schematic diagram showing a display screen of a slot machine according to the present invention.

[FIG. 3]

This is a schematic diagram showing a display screen of a slot machine according to the present invention.

[FIG. 4]

This is a schematic diagram showing a display screen of a slot machine according to the present invention.

[FIG. 5]

This is a perspective view showing the outline of a slot machine according to the present invention.

[FIG. 6]

This is an illustrative diagram showing the display device of a slot machine according to the present invention.

[FIG. 7]

This is an illustrative diagram showing the display device of a slot machine according to the present invention.

[FIG. 8]

This is a block diagram showing a circuit configuration of a slot machine according to the present invention.

[FIG. 9]

This is a block diagram showing a circuit configuration of a slot machine according to the present invention.

[FIG. 10]

This is a block diagram showing a circuit configuration of a slot machine according to the present invention.

[FIG. 11]

This is a block diagram showing a circuit configuration of a slot machine according to the present invention.

[FIG. 12]

This is a block diagram showing a circuit configuration of a slot machine according to the present invention.

DETAILED DESCRIPTION OF THE INVENTION

An embodiment of the present invention is described below with reference to the drawings. The embodiment is a slot machine according to the present invention using a plurality of mechanical reels as a variable display device for variably displaying two or more kinds of images necessary for games. However, the present invention may be embodied in not only slot machines but also various gaming machines such as pachinko gaming machines, medal gaming machines, card gaming machines, and the like.

[Configuration of Slot Machine]

Figure 1:
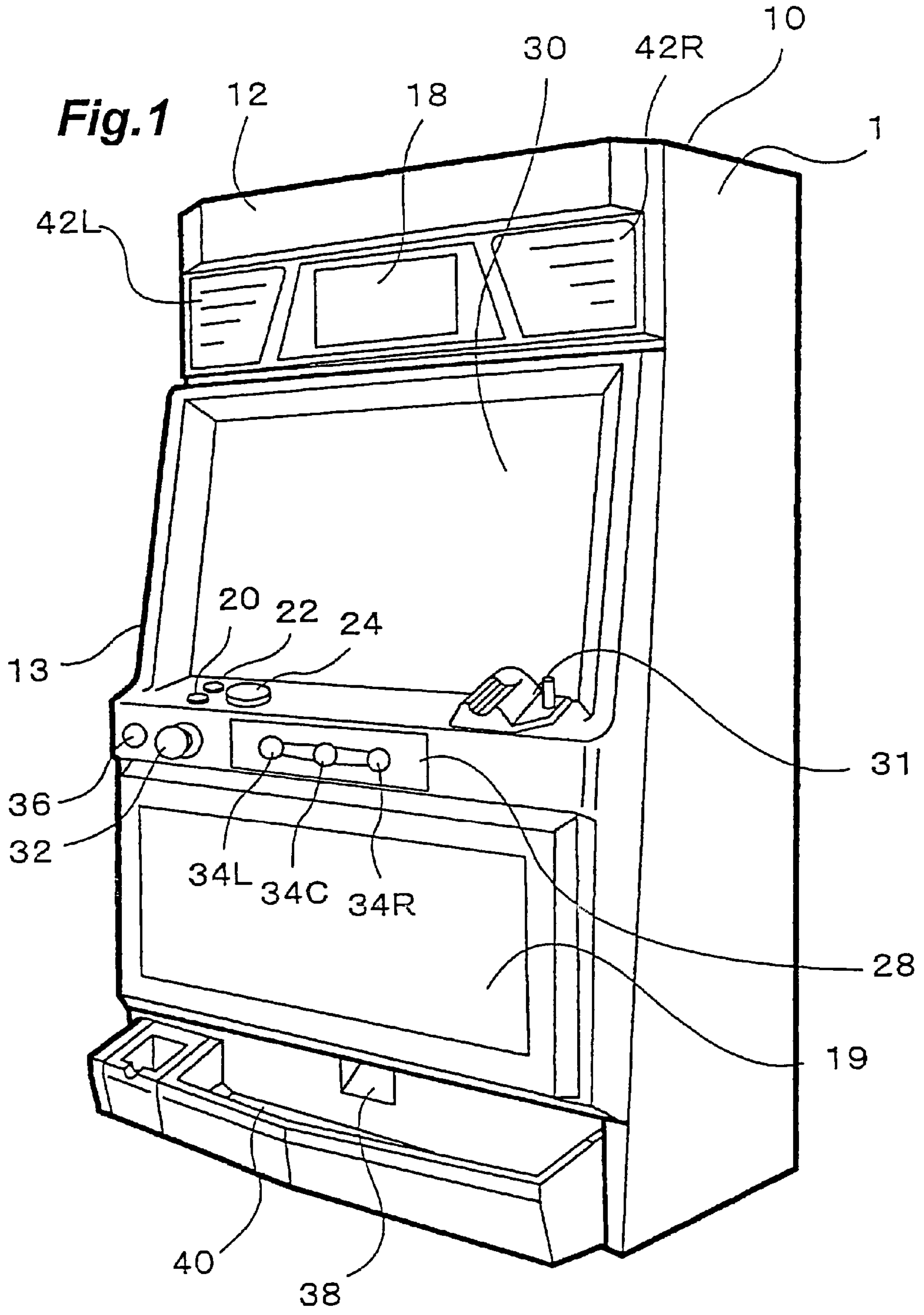
[FIG. 1]

The outline of a slot machine 10 is shown in FIG. 1.

The cabinet 12 forming the outer part of the slot machine 10 consists of a main body 11 and a door 13.

On the front of the cabinet 12 forming the whole of the slot machine 10, an upper decoration panel 18 and a lower decoration panel 19 are provided above and below the rectangular display device 30 respectively. The upper decoration panel 18 and the lower decoration panel 19 are used in order that gaming machines having them are distinguished from other gaming machines by means of the letters and/or patterns drawn on the panels so as to cause a player to select the kind of a gaming machine. The upper decoration panel 18 and the lower decoration panel 19 are so structured and configured that high transparency materials are used so that the panels are well visible also in a gaming place at a relatively low illumination level and are illuminated by the illuminating lamps 57 (see FIG. 6) provided at the back of them so that the designs on the panels are displayed brightly.

Furthermore, the display device 30 is a liquid crystal display, on which various images such as notifying images for the contents of a game and effect images for pleasing a player are displayed as described later. This "display device" corresponds to "transparent liquid crystal device" in the claim.

Furthermore, the display device 30 is capable of displaying images of XGA-type, horizontal 1024 bits, vertical 768 bits, 8-bit red data, 8-bit green data, and 8-bit blue data.

As described later in detail, the display device 30 is capable of controlling displayed images such that they have a relatively high transparency, and hence it becomes possible that the display device 30 allows a player to visually identify the rotatary reels 26L, 26C, and 26R (see FIG. 2) provided at the back of the display device 30.

The display panel 30 is provided with a touch panel 51 (see FIG. 6), which allows player's various operations.

Figure 2:
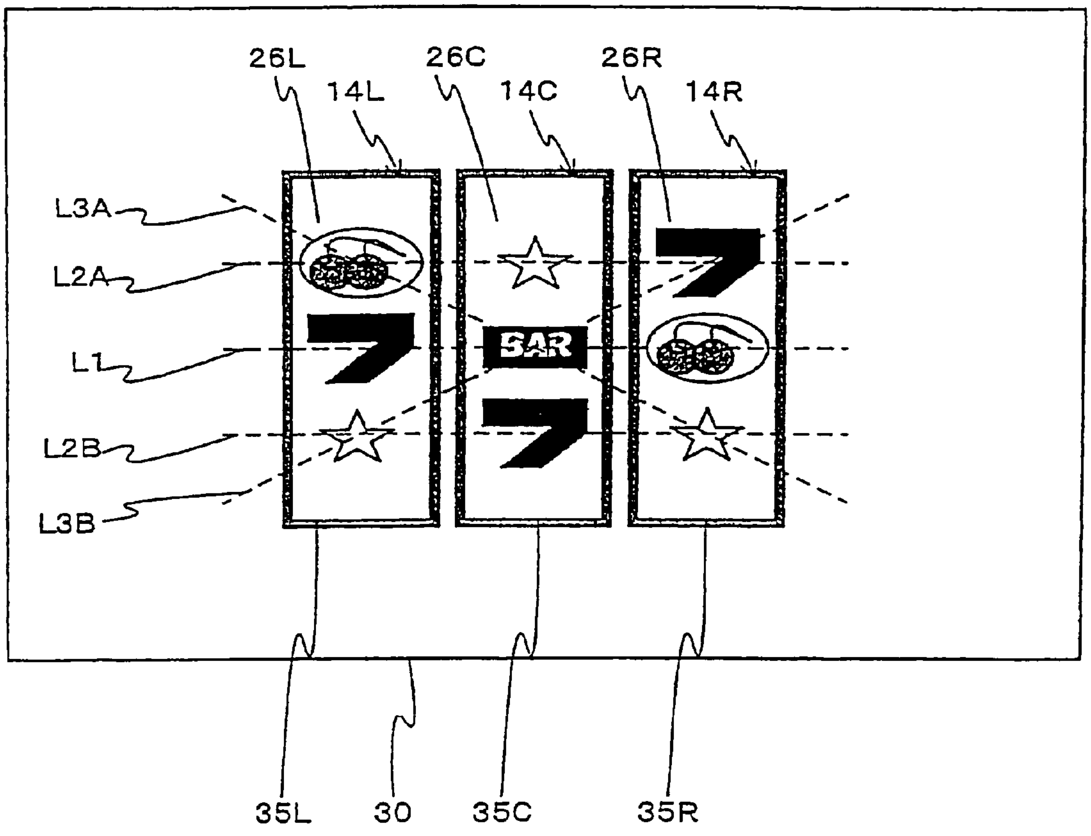

Furthermore, on the back of the display device 30, rectangular display windows 14 (1L, 14C, and 14R) are provided as shown in FIG. 2. A mask 33 (see FIG. 4) surrounding the display windows 14 is so provided as described later that a player can visually identify only the reels 26L, 26C, and 26R when the display device 30 displays an image in a state that it has relatively high transparency.

Inside of the cabinet 12, three reels 26L, 26C, and 26R, on the outer peripheries of which two or more kinds of symbols are drawn, are provided rotatably. Each of the reels 26L, 26C, and 26R is provided so as to be visible through the display windows 14 mentioned above.

Furthermore, as described later, the reels 26L, 26C, and 26R are rotated in such a manner that the symbols drawn on the outer periphery of the reels 26L, 26C, and 26R are seen through the display windows 14 as if they are moving from top to bottom. When each of the reels 26L, 26C, and 26R has stopped, three of the symbols drawn on the outer periphery of each of the reels stop so as to be visible through the display windows 14.

Furthermore, as shown in FIG. 1, under the display device 30, a generally horizontal base portion 28 is provided, and on the right top of it, a medal insertion slot 31 is provided.

On the left top of the base portion 28, a 1-BET switch 20 which is pushed one time when only one of the medals already inserted in the slot machine is bet, a 2-BET switch which is pushed one time when only two of the medals already inserted in the slot machine are bet, and a MAX-BET switch 24 which is pushed one time when the maximum number of medals of the medals already inserted in the slot machine which can be bet on one game are bet.

When a player operates the 1-BET switch 20, only the pay line L1 comprising, as shown in FIG. 2, a combination of three symbols each being the middle symbol of three visible symbols on each of the three reels becomes effective for the judgment of a game result (hereinafter a combination of symbols which becomes effective for the judgment of the game result is called "effective line").

Furthermore, when a player operates the 2-BET switch 22, three pay lines in total become effective which include the pay lines L2A and L2B comprising a combination of three symbols each being the upper symbol and lower symbol respectively of three visible symbols on each of the three reels in addition to the aforementioned effective line.

In addition, when the MAX-BET switch 24 is operated, if the number of medals already inserted in the slot machine is three or more, all of the five pay lines, i.e. the pay lines L1, L2A, L2B, L3A, and L3B become effective which include the pay line L3A comprising a combination of the upper symbol on the reel 26L, the middle symbol on the reel 26C, and the lower symbol on the reel 26R, and the pay line L3B comprising a combination of the lower symbol on the reel 26L, the middle symbol on the reel 26C, and the upper symbol on the reel 26R in addition to the aforementioned effective lines.

However, when the number of remaining medals already inserted in the slot machine is two, only the three pay lines L1, L2A, and L2B of the five pay lines become effective, and when the number of remaining medals is one, only the pay line L1 of the five pay lines becomes effective. Which of the pay lines has become effective is shown on a side portion of the display window 14 for notifying the player.

When a player pushes the BET switch 20, 22, or 24, the pay lines become effective according to which of the BET switches has pushed. When a player pushes the 1-BET switch 20, 2-BET switch, or MAX-BET switch 24, the slot machine comes to the state of enabling starting a game.

Furthermore, as shown in FIG. 1, a start lever 32 is provided tiltably on the left front of the base portion 28. When a player tilts the start lever 32, the aforementioned three reels 26L, 26C, and 26R start to rotate at the same time. When the three reels 26L, 26C, and 26R rotate, the symbols drawn on the outer peripheries of the reels 26L, 26C, and 26R are variably displayed through the display windows 14. When the reel rotation speed of the aforementioned three reels 26L, 26C, and 26R have reached to a predetermined speed, the operations of the reel stop buttons 34L, 34C, and 34R, described later, by a player become effective.

On the middle front of the base portion 28, the three reel stop buttons 34L, 34C, and 34R are provided. The reel stop buttons 34L, 34C, and 34R correspond to the reels 26L, 26C, and 26R respectively. When a player pushes the reel stop button 34L, the reel 26L stops, when a player pushes the reel stop button 34C, the reel 26C stops, and when a player pushes the reel stop button 34R, the reel 26R stops.

At the left side of the start lever 32, a payout button 36 is provided. When a player pushes the payout button 36, medals inserted in the slot machine are paid out from the medal payout opening 38 provided at the lower front of the slot machine, and then stored in the medal receiving unit 40.

Furthermore, above the medal receiving unit 40, speaker grills 42 are provided through which sound emitted from the speakers 46 (see FIG. 8) mounted inside of the cabinet 12 is output.

On the outer periphery of each of the aforementioned reels 26L, 26C, and 26R, a predetermined number e.g. 21 of images including two or more kinds of images are drawn. According to the arrangement of these images which are visible through the display windows 14 when the rotation of each of the reels 26L, 26C, and 26R has stopped, payout of medals, progress of the game to a state which is advantageous to the player, or the like is conducted.

[Display of Slot Machine]

As described above, the display device 30 is described below with reference to FIGS. 2 to 4.

The display device 30 is capable of displaying various images including high-transparency images. The "high-transparency image" means an image formed in a color tone which is substantially light transparent on the liquid crystal display device, and when displayed on the display windows 14, the symbols on the reels at the back of the display windows can be identified visually although degrees of display vary according to color tones to be used. Further, such images allow various images and high-transparency images to be displayed not only as a whole but also partially.

For example, the display device 30 performs displaying along the display windows 14 in such a way that the transparency becomes high, so that the reels 26L, 26C, and 26R provided at the back of the display windows can be identified visually by a player as shown in FIG. 2. Further, at the outer edges of the reels 26L, 26C, and 26R, edging images 35 (35L, 35C, and 35R) are displayed.

Figure 3:
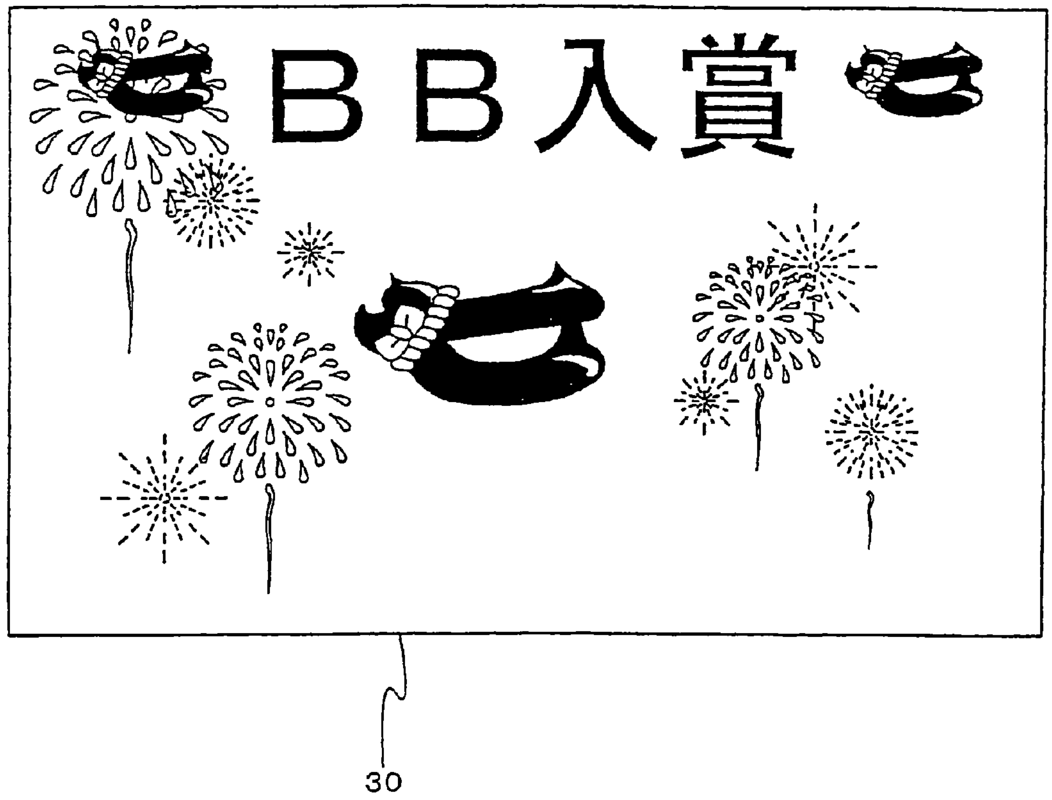

Furthermore, in addition to that the display device 30 performs displaying in such a way that the transparency of it becomes high, various effect images using low transparency color tones (so-called "black output") can be displayed, as shown in FIG. 3, in such a way that a player can not visually identify the reels 26L, 26C, and 26R provided at the back of the display device 30.

Figure 4:
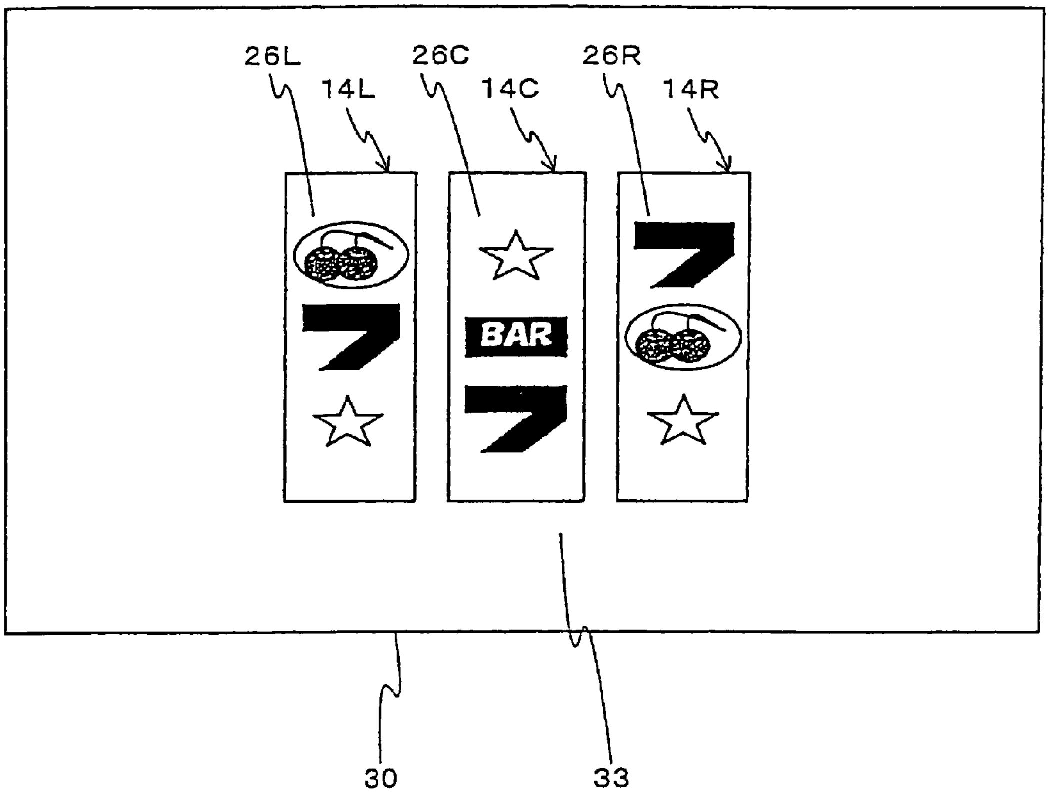

Furthermore, the display device 30 can perform displaying in such a way that the transparency of the whole of it becomes high, as shown in FIG. 4, so that a player can visually identify the reels 26L, 26C, and 26R through the display windows 14, and can visually identify the mask 33 provided around the display windows 14. In this way, since the mask 33 is provided, only necessary minimum parts to be visually identified by a player are actually visible, but the other parts are not visible.

[Configuration of Boards of Slot Machine]

Figure 5:
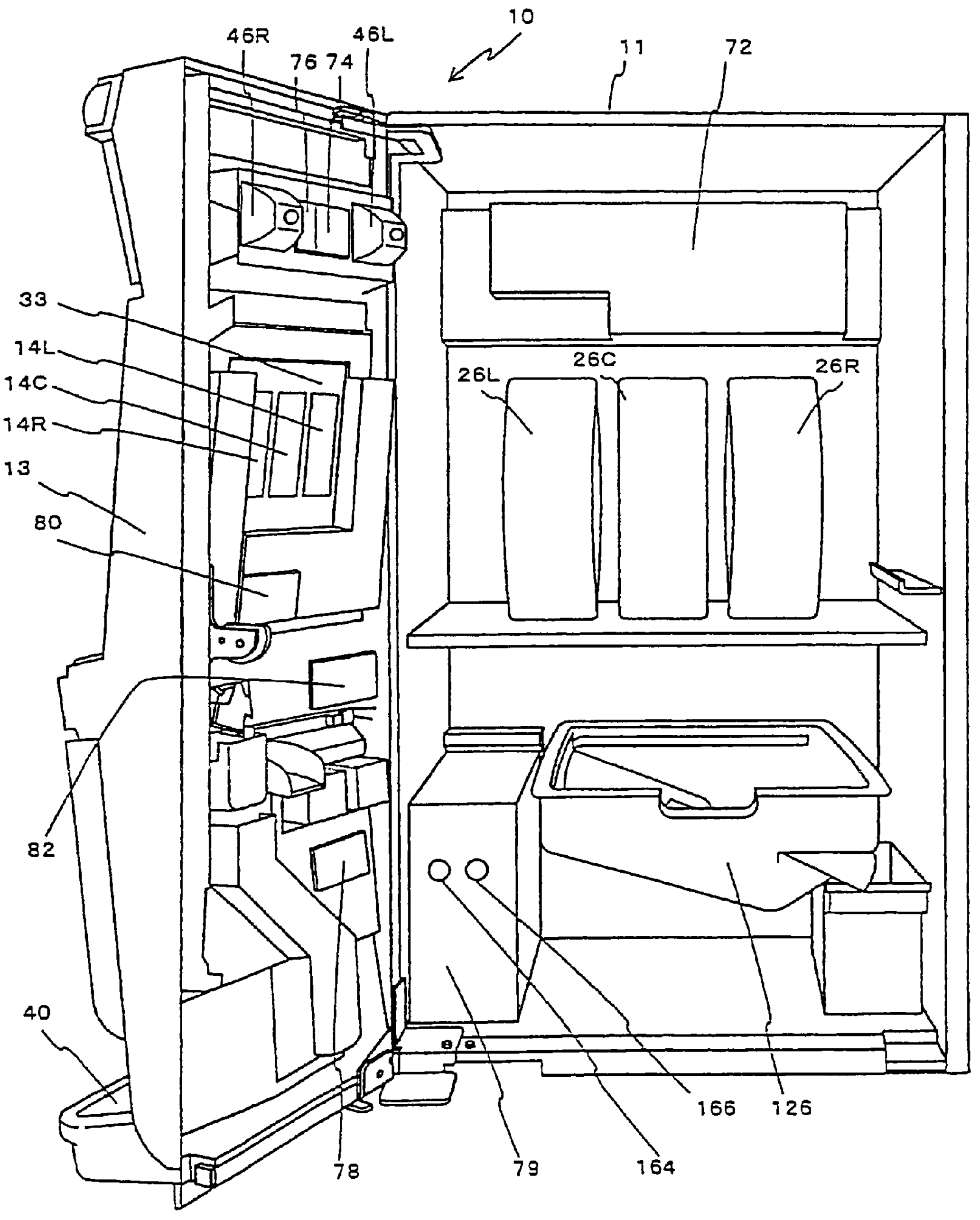

FIG. 5 is a schematic diagram showing the inside of the cabinet of the slot machine. In FIG. 5, the door 13 of the slot machine 10 is opened.

As shown in FIG. 5, the slot machine 10 is provided with various devices and control boards in it.

Figure 8:
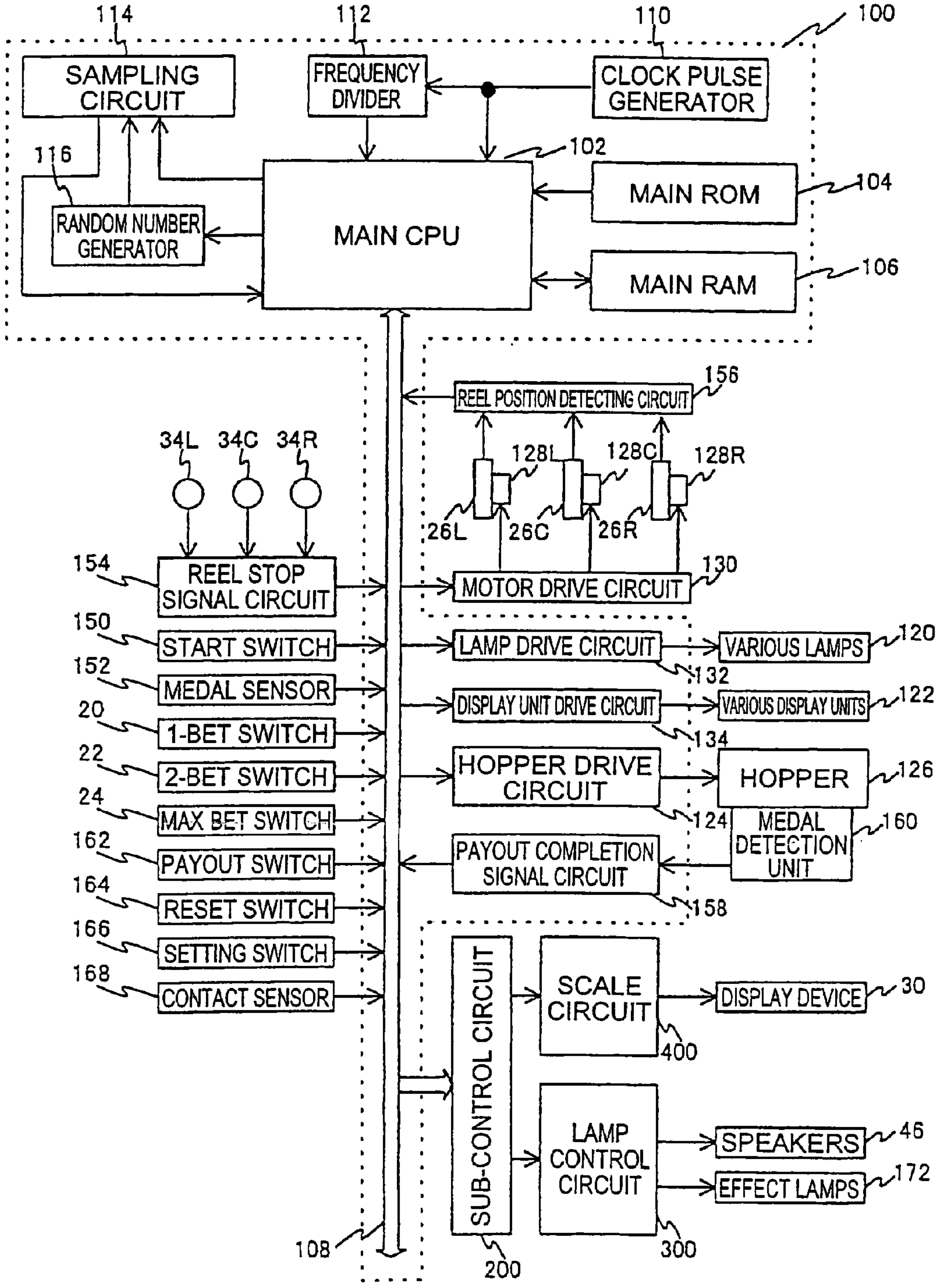

The main body 11 of the slot machine 10 is provided with, as shown in FIG. 5, various boards and devices including reels 26L, 26C, and 26R, a hopper 126 capable of storing gaming mediums, and a power source device 79 for supplying electric power to the whole of the slot machine 10, and in addition, a main control board 72 on which a main control circuit 100 (see FIG. 8) is mounted, containing a random number generator 116 for generating random numbers used for determining by lot whether a condition advantageous to a player is generated (see FIG. 8), and a main CPU 102 (see FIG. 8).

On the other hand, the door 13 of the slot machine 10 is provided with, as shown in FIG. 5, various devices and control boards including a sub-control board 74, a scale board 76, a lamp control board 78, an image display subsidiary board 80, and a power source relay board 82.

These boards contain various circuits.

The sub-control board 74 contains a sub-control circuit 200 (see FIG. 8) which determines various effects based on or not based on signals and/or commands from the main control circuit 100.

The scale board 76 contains a scale circuit 400 (see FIG. 8) which applies an enlarging conversion to image signals supplied from the sub-control board 74, causes the display device 30 to display enlarged images, watches signals supplied from the sub-control board 74, and executes various controls of the display device 30 when determining that there is an abnormal condition.

The lamp control board 78 contains a lamp control circuit 300 (see FIG. 8) which produces lamp effects and sound effects based on effect signals supplied from the sub-control board 74.

The image display subsidiary board 80 contains an image display subsidiary circuit (not shown) which is a component of the display device 30, drives image signals supplied from the scale board 76, and controls the liquid crystal backlights 292 (see FIG. 11) of the display device 30.

The power source relay board 82 has a function of exclusively receiving electric power from the power source device 79 to distribute electric power to the boards and devices mentioned above individually.

The sub-control board 74 and the scale board 76 mentioned above are disposed at the upper part of the door 13.

The lamp control board 78 is disposed at the lower part of the door 13 from an arrangement viewpoint, because its output is less susceptible to noise and static electricity as compared with the sub-control board 74 and the scale board 76.

In the slot machine 10 of this embodiment, the main control board 72 is provided on the main body 11, and the sub-control board 74 and the other boards are provided on the door 13. However, the present invention is not limited thereto. The sub-control board 74 and the other boards may be provided on the main body 11, and the main control board 72 may be provided on the door 13.

Furthermore, the power source device 79 is provided with a reset switch 164, a setting switch 166, etc.

[Structure of Illuminating Lamp and Reflection Plate]

Next, the details of the illuminating lamps 57 and reflection plates 59 of the slot machine 10 will be described with reference to FIG. 6.

The illuminating lamps 57 are attached to the upper decoration panel 18 and lower decoration panel 19. The illuminating lamps 57 illuminate the symbols drawn on the outer peripheries of the reels not only directly but also indirectly via the reflection plates 59, and illuminate the upper decoration panel 18 and lower decoration panel 19 directly. An opening is provided in an inside portion, in the gaming machine, of each of the decoration panel 18 and lower decoration panel 19 so that the illuminating lamps 57 illuminate the upper decoration panel 18 and lower decoration panel 19 directly.

Figure 6:
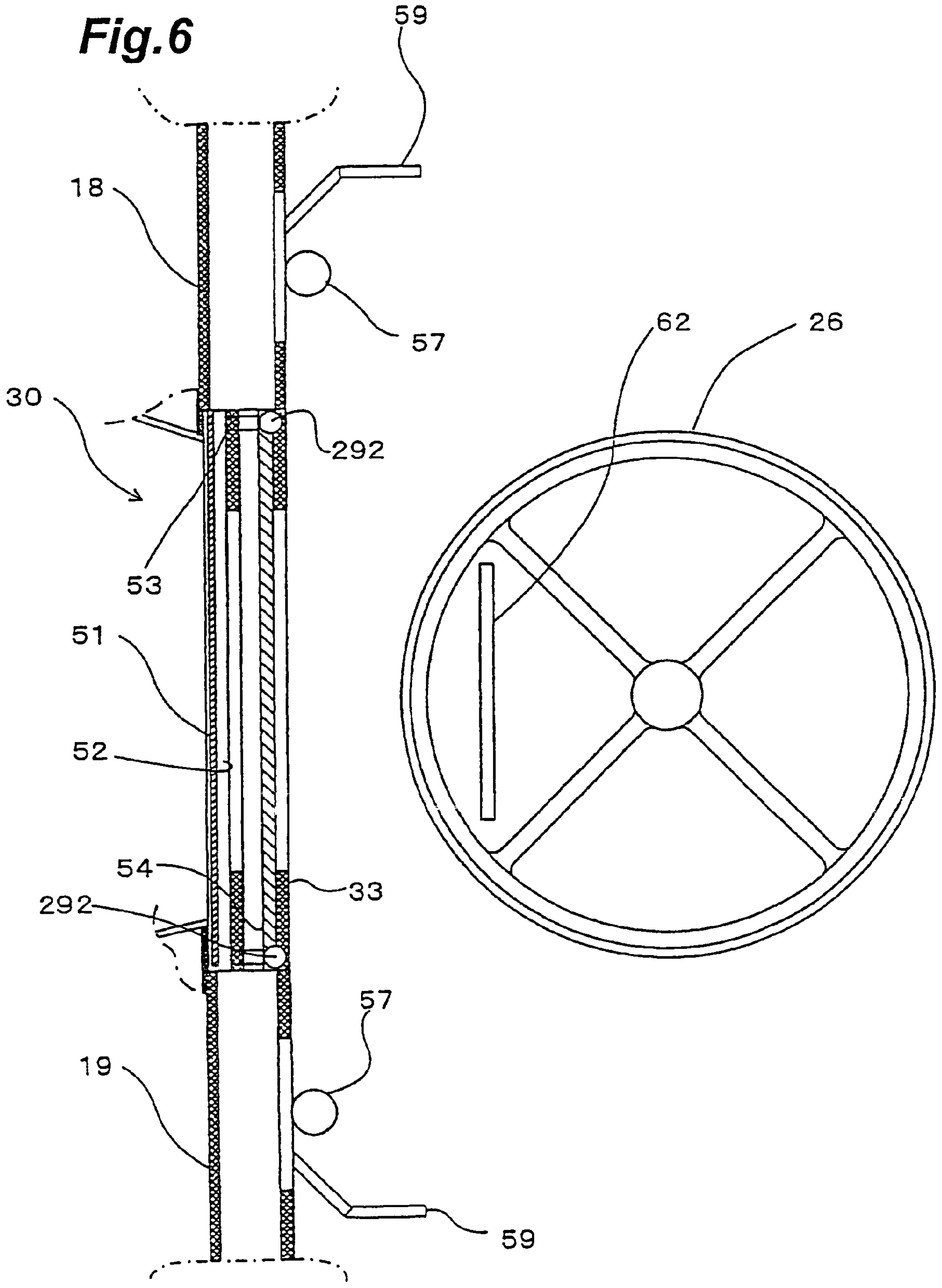

Next, the reflection plates 59 as shown in FIG. 6 are not disposed between the illuminating lamps 57 and the upper decoration panel 18 and lower decoration panel 19, but are disposed at the positions where the light emitted from the illuminating lamps 57 and irradiated directly to the upper decoration panel 18 and lower decoration panel 19 is not substantially blocked, and where the light not irradiated directly to the reels is reflected so as to be guided indirectly to the reels.

Furthermore, the reflection plates 59 are disposed in the area provided between the reels 26 and the upper decoration panel 18 and lower decoration panel 19 and at the positions which are not (1) positions between the display windows 14 and the reels 26, (2) positions between the illuminating lamps 57 and the upper decoration panel 18 and lower decoration panel 19, and (3) positions of the reels 26 and the illuminating lamps 57, in the state that the faces reflecting the light from the illuminating lamps 57 are directed to the reels 26. In this connection, “illuminating lamp” corresponds to “light source unit” described in the claims, and “reflection plate” corresponds to “light source unit” described in the claims.

As a result, the gaming machine of the present invention “comprises a cabinet, decoration panels provided on the front of the cabinet, display windows provided on the front of the cabinet, a plurality of rotatary reels, on the outer peripheries of which a plurality of symbols visible through the display windows are drawn, light source units for illuminating the decoration panels from the inside of the cabinet, and reflection units for guiding the light emitted from the light source units to illuminate the plurality of symbols”. Therefore, the light emitted from the light source units is guided to the symbols without being diffused by the reflection units, and thereby the symbols are illuminated more brightly than in a gaming machine having no reflection unit.

In this embodiment, the illuminating lamps 57 are attached to the upper decoration panel 18 and lower decoration panel 19. However, the present invention is not limited thereto. The illuminating lamps 57 may be attached to other portions such as an upper inside portion and lower inside portion of the display device 30 provided that at least the illuminating lamps 57 illuminate the decoration panels 18 directly.

Furthermore, in this embodiment, the illuminating lamps 57 illuminate the upper decoration panel 18 and lower decoration panel 19 directly. However, the present invention is not limited thereto. The illuminating lamps 57 may illuminate the upper decoration panel 18 and lower decoration panel 19 also indirectly via the reflection plates 59.

Furthermore, in this embodiment, the reflection plates 59 are formed into a dogleg shape. However, the present invention is not limited thereto. The reflection plates 59 may be formed into any shape provided that the light emitted from the illuminating lamps illuminates the symbols drawn on the outer peripheries of the reels 26 indirectly.

[Structure of Display Device]

Furthermore, the details of the display device 30 of the slot machine 10 will be described with reference to FIG. 6.

The door 13 is provided with the display device 30 by which various effect images are displayed.

The display device 30 comprises a touch panel 51 for detecting coordinates of points-touched by a player, a transparent acryl plate 52 which is a protection cover, a symbol sheet 53 made of a transparent film on which various symbols are printed, and a liquid crystal display device 54 consisting of a transparent liquid crystal display device such as ITO; the symbol sheet 53 and the liquid crystal display device 54 are laminated at the inner surface of the transparent acryl plate 52.

Furthermore, above and below the liquid crystal display device 54, liquid crystal backlights 292 are provided which act as lighting devices for backlighting the liquid crystal display device 54. The liquid crystal backlights 292 are controlled so as to light when electric power is supplied. Thus, since the liquid crystal backlights 292 are always driven while electric power is always supplied, a player is able to identify the images displayed on the liquid crystal display device 54 visually and clearly. Cold-cathode tubes are mainly used as the liquid crystal backlights 292. However, the present invention is not limited thereto.

Individual display components work in such a way that the symbols drawn on the symbol sheet 53 are always visually identified by a player without depending on the effect control state of the slot machine 10. The liquid crystal display device 54 provides areas in which image effects such as big hit effects and various notice effects are displayed.

In addition, near the front of the reels 26, lamp housings 62 (62L, 62C, and 62R) equipped with reel back lamps 63 (63L, 63C, and 63R) (see FIG. 7) respectively are provided.

[Structure of Reel Back Lamp]

Figure 7:
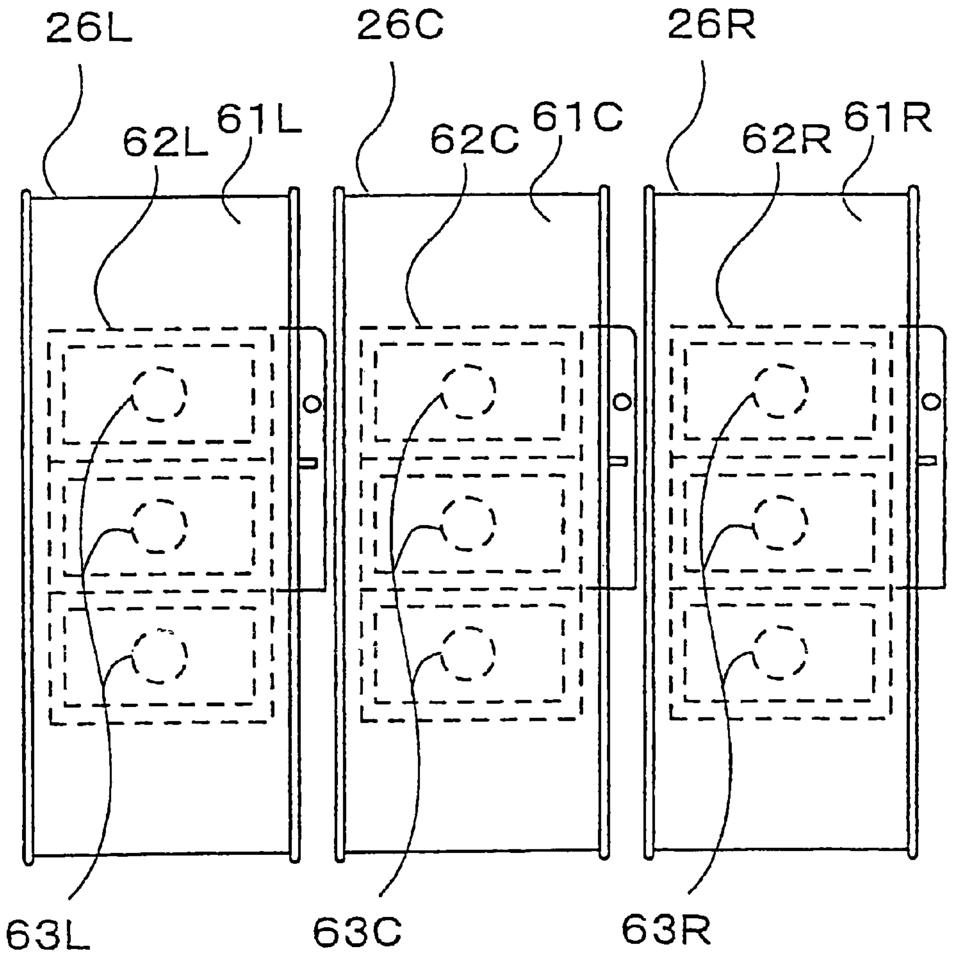

The reel back lamps 63 are described below with reference to FIG. 7, which is an enlarged schematic diagram showing the reels 26L, 26C, and 26R.

The reel bands 61L, 61C, and 61R of the reels 26L, 26C, and 26R are made of translucent film. On the surface of the reel bands 61L, 61C, and 61R, symbols such as "cherry" symbols and "7" symbols are printed with colored ink which is substantially light transparent. Masking treatment is applied to areas other than the symbol areas on the reel bands 61 using light blocking ink.

The lamp housings 62L, 62C, and 62R are provided at the back of the reel bands 61L, 61C, and 61R respectively so that the emission of each of the lamps does not interfere with other symbol areas. In the rooms of the lamp housings 62L, 62C, and 62R, the reel back lamps 63L, 63C, and 63R are provided respectively.

The lamp control circuit 300 turns the reel back lamps 63L, 63C, and 63R on and off based on the parameters determined by the sub-microcomputer 210.

For example, the lamp control circuit 300 turns on and off the reel back lamps 63L, 63C, and 63R corresponding to the symbols on a pay line when medals are paid out, or the lamp control circuit 300 has a mode of turning on and off the reel back lamps every internal winning combination, and when each winning flag is established, the lamp control circuit 300 turns the reel back lamps on and off in a mode corresponding to the flag to give the player a suggestion about which winning symbols are to be targeted.

Furthermore, the reel back lams 63L, 63C, and 63R usually continue to be lit in order to allow a player to visually identify symbols easily. Further, at power-on or reset, the reel back lamps 63L, 63C, and 63R are turned on so that the reel back lamps are effective.

[Configuration of Control Unit of Slot Machine]

FIG. 8 shows a circuit configuration including a main control unit 100 for controlling gaming process operations, peripheral devices electrically connected with the main control unit 100, and a sub-control unit 200, a lamp control circuit 300, and a scale circuit 400 for controlling the display device 30, speakers 46, and effect lamps 172 based on the control commands sent from the main control circuit 100.

The main control circuit 100 comprises a main CPU 102, a main ROM 104, a main RAM 106, an input/output bus 108, a clock pulse generator 110, a frequency divider 112, a sampling circuit 114, and a random number generator 116 which are disposed on a circuit board.

The main CPU 102 is capable of controlling various peripheral devices according to the programs stored in the main ROM 104, by outputting data signals or address signals to the peripheral devices through the input/output bus 108, and based on data signals or address signals which are input from the peripheral devices through the input/output bus 108. Further, a timer (not shown) is provided in the main CPU 102.

The main CPU 102 is connected with the main ROM 104. In the main ROM 104, various programs such as control programs for controlling the flows of the whole games of the slot machine 10, and initial data used for executing the control programs are stored.

For example, a probability drawing table used for the determination of random number sampling executed every time the start lever 32 is operated (start operation), a stop control table for determining how to stop the reels according to the operation of the stop button, a winning symbol combination table which corresponds to the symbols stationarily displayed based on the stop control table to determine the number of medals to be paid out, various control commands to be sent to the sub-control circuit 200, and the like are stored in the main ROM 104. Details of the probability drawing table, stop control table, and winning symbol combination table will be described later.

The various control commands include a "demonstration display command", a "start command", an "all-reel stop command", a "winning combination command", etc. The sub-control circuit 200 does not input any command, etc. to the main control circuit 100. Commands, etc. are sent in one direction from the main control circuit 100 to the sub-control circuit 200. The main control circuit 100 and the sub-control circuit 200 are connected through 16 data signal lines and one signal line. And, each of these commands comprises 2, 4, or 6 bytes which are sent as one command in 1, 2, or 3 sequences in order to be sent through 16 data signal lines.

The main CPU 102 is also connected with the main RAM 106 which stores the flags and the values of variables used in the above-mentioned programs.

The main CPU 102 is also connected with a clock pulse generator 110 and frequency divider 112 for generating base clock pulses, and a random number generator 116 and sampling circuit 114 for generating random numbers to be sampled.

The random number generator 116 generates random numbers within a fixed range of numbers, and the sampling circuit 114 samples one random number at an appropriate time after the start lever 32 has been operated.

Based on a random number sampled like this and the probability drawing table stored in the main ROM 104, an internal winning combination is determined. After an internal winning combination has been determined, a random number is sampled again for selecting the "stop control table," and the "stop table" contained in it.

The random number generator 116 generates random numbers within a fixed range of numbers, e.g., 0 to 65535 (the 16th power of 2). The present invention is not limited to generating random numbers from the random number generator 116, and may be configured to execute random number sampling on the operation program of the main CPU 102. In this case, the random number generator 116 and sampling circuit 114 may be omitted or may be retained for the backup of the random number sampling operation.

Furthermore, main input signal generating means for generating input signals necessary for the main CPU 102 to generate control commands include a start switch 150, a 1-BET switch 20, a 2-BET switch 22, a MAX-BET switch 24, a deposited-medal adjusting button 36, a medal sensor 152, a reel stop signal circuit 154, a reel position detecting circuit 156, a payout completion signal circuit 158, a payout switch 162, a reset switch 164, a setting switch 166, and a contact sensor 168. These input signal generating means are also connected with the main CPU 102 via the input/output bus 108.

The reel stop signal circuit 154 detects the operation of each of the stop buttons 34L, 34C, and 34R, and when detecting the operation, it sends a stop signal to the main CPU 102 through the input/output bus 108.

The start switch 150 detects the operation of the start lever 32, and when detecting the operation of the start lever 32, it send a start signal to the main CPU 102 through the input/output bus 108.

The medal sensor 152 detects a gaming medal inserted in the medal insertion slot 31, and when detecting a gaming medal inserted in the medal insertion slot 31, it sends a medal insertion signal to the main CPU 102 through the input/output bus 108.

The 1-BET switch 20 detects the operation of the 1-BET switch 20, and when detecting the operation of the 1-BET switch 20, it sends a 1-BET signal to the main CPU 102 through the input/output bus 108.

The 2-BET switch 22 detects the operation of the 2-BET switch 22, and when detecting the operation of the 2-BET switch 22, it sends a 2-BET signal to the main CPU 102 through the input/output bus 108.

The MAX-BET switch 24 detects the operation of the MAX-BET switch 24, and when detecting the operation of the MAX-BET switch 24, it sends a MAX-BET signal to the main CPU 102 through the input/output bus 108.

The payout switch 162 detects the operation of the payout button 36, and when detecting the operation of the deposited-medal adjusting button 36, it sends a deposited-medal adjusting signal to the main CPU 102 through the input/output bus 108.

The reset switch 164 is provided in the slot machine 10, and when detecting the operation of the reset switch 164, it sends a reset signal to the main CPU 102 through the input/output bus 108.

The setting switch 166 detects the operation of the setting button (not shown) provided in the slot machine 10, and when detecting the operation of the setting button, it sends a reset signal to the main CPU 102 through the input/output bus 108.

The reel position detecting circuit 156 receives pulse signals from the reel rotation sensors to send reel position signals for detecting the positions of the reels 26L, 26C, and 26R to the main CPU 102 through the input/output bus 108.

The payout completion signal circuit 158 detects that the payout of gaming medals has completed when the number counted by the medal detection unit 160 (the number of medals paid out from the hopper 126) has reached a predetermined number data, and then sends a payout completion signal representing the detection to the main CPU 102 through the input/output bus 108.

Devices the operations of which are controlled by the signals from the main control circuit 100 mainly include various lamps 120, various display units 122, a hopper 126 (including a drive unit for payout) for paying out a predetermined number of gaming medals according to the command of the hopper drive circuit 124, and stepping motors 128L, 128C, and 128R for rotating the reels 26L, 26C, and 26R. The various lamps 120 include the illuminating lamps 57.

Furthermore, a motor drive circuit 130 for driving and controlling the stepping motors 128L, 128C, and 128R, the hopper drive circuit 124 for driving and controlling the hopper 126, a lamp drive circuit 132 for driving and controlling the various lamps, and a display unit drive circuit 134 for driving and controlling the various display units are connected with the output unit of the main CPU 102 via the input/output bus 108. These drive circuits receive control signals such as drive commands which are output from the main CPU 102 to control the operations of the various devices.

Devices the operations of which are controlled by the control signals from the main control circuit 100 also include a sub-control circuit 200.

The sub-control circuit 200 is connected with a lamp control circuit 300, a scale circuit 400, a display device 30, speakers 46 (46L and 46R), and effect lamps 172.

The display device 30 receives image signals supplied from the sub-control circuit 200 and scale circuit 400 to display images.

The speakers 46 receive voice signals supplied from the sub-control circuit 200 and lamp control circuit 300 to emit voices.

The effect lamps 172 receive effect signals supplied from the sub-control circuit 200 and lamp control circuit 300 to produce effects. The effect lamps 172 include the reel back lamps 63.

[Electrical Configuration of Sub-control Circuit]

Figure 9:
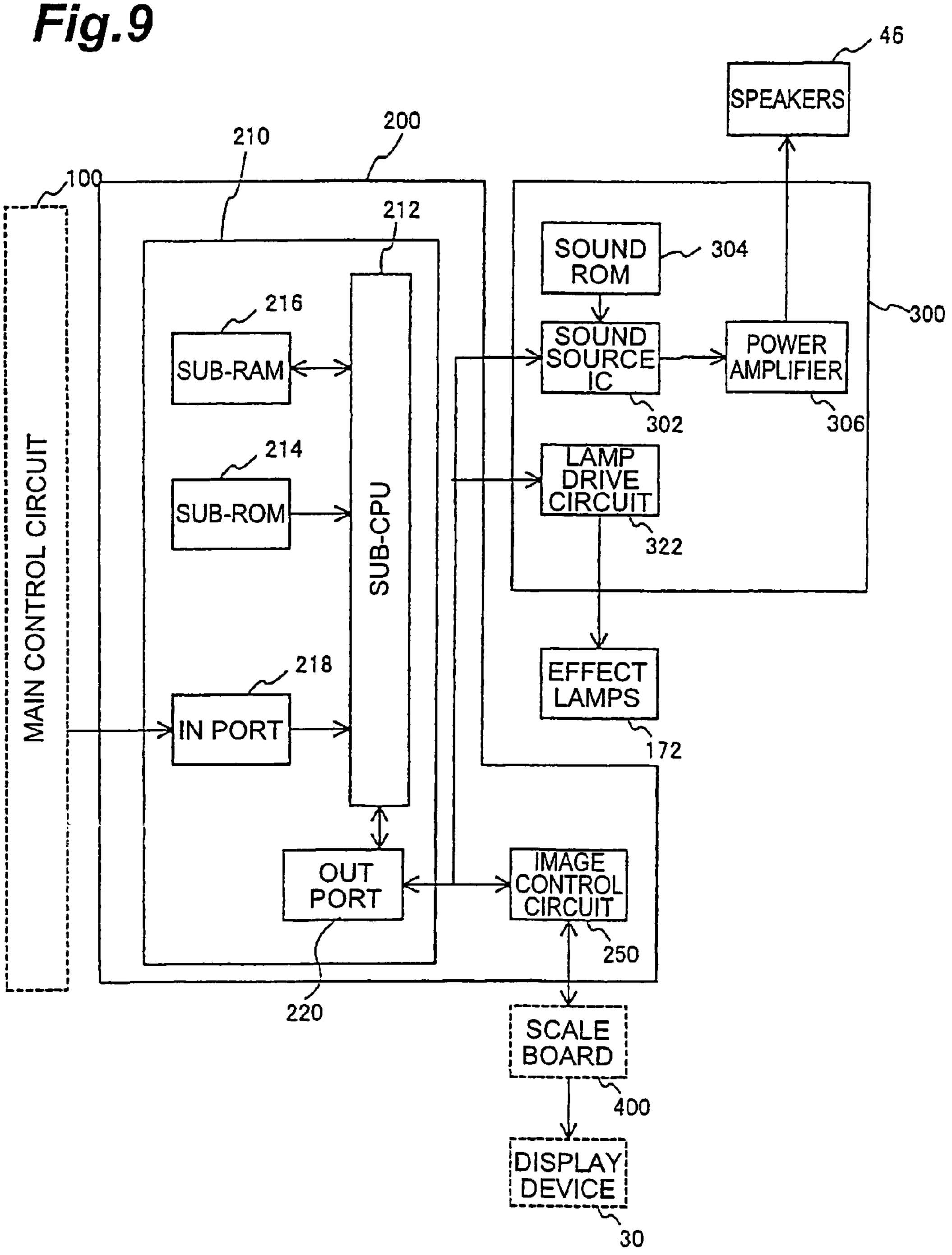
Figure 10:
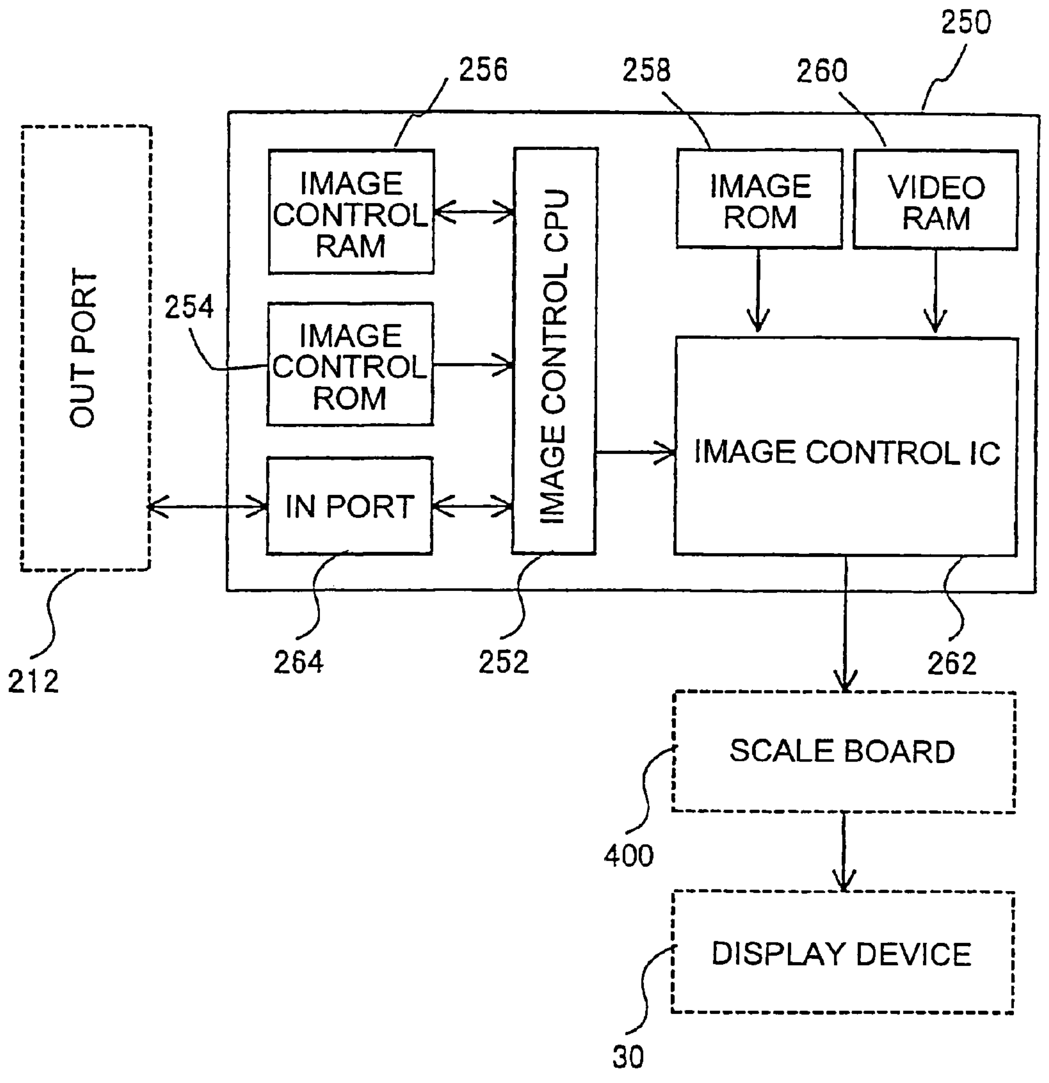

The sub-control circuit 200 is described below with reference to FIGS. 9 and 10. The block diagrams of FIGS. 9 and 10 show the configuration of the sub-control circuit 200.

The sub-control circuit 200 executes display control for the display device 30, voice output control for the speakers 46, and effect production control for the effect lamps 172 automatically or based on the control commands from the main control circuit 100.

The sub-control circuit 200 is mounted on a circuit board other than a circuit board on which the main control circuit 100 is mounted, and comprises a sub-microcomputer 210 as a main component of it, and an image control circuit 250 for controlling the display of the display device 30.

The sub-microcomputer 210 comprises a sub-CPU 212 for executing control operations according to the control commands sent from the main control circuit 100, a sub-ROM 214 in which control programs for the sub-microcomputer 210 are stored, a sub-RAM 216, an IN port 218, and an OUT port 220.

The sub-control circuit 200 does not have a clock pulse generator, a frequency divider, a random number generator, and a sampling circuit, but is configured so as to execute random number sampling on the operation program of the sub-CPU 212.

The sub-CPU 212 determines what effects are to be produced by the various effect control circuits to based on the game information commands sent from the main control circuit 100, and sends the contents of the determination to the various effect control circuits.

In the sub-ROM 214, programs for the communication sequence between the sub-CPU 212 and the main control circuit 100, an effect selection table for selecting various effects based on the received game information, sound sequence programs, etc. are stored.

The sub-RAM 216 provides work areas used when these control programs are executed.

The IN port 218 has a function of receiving game information such as images and voices supplied from the main control circuit 100, and supplying the game information to the sub-CPU 212.

The IN port 218 only supplies the game information from the main control circuit 100 to the sub-CPU 212, but does not supply any signal from the sub-CPU 212 to the main control circuit 100. For this reason, even if any malfunction has occurred in the sub-control circuit 200, the malfunction does not transfer to the main control circuit 100.

The OUT port 220 has a function of supplying image display signals to the image control circuit 250, a function of supplying voice generating signals to the sound source IC 302 of the lamp control circuit 300, and a function of supplying effect lamp signals to the lamp control circuit 300 in order to turn the effect lamps 172 on and off.

The image control circuit 250 comprises, as shown in FIG. 10, an image control CPU 252, an image control ROM 254, an image control RAM 256, an image ROM 258, a video RAM 260, an image control IC 262, and an IN port 264.

The image control CPU 252 receives parameters determined by the sub-microcomputer 210 through the IN port 264, and determines the contents of display on the display device 30 according to the image control sequence program stored in the image control ROM 254.

In the image control ROM 254, a sequence program for receiving image effect commands sent from the sub-microcomputer 210, an image control sequence program for controlling the image control IC 262, etc. are stored.

The image control RAM 256 provides work areas used when the image control program is executed.

The image control IC 262 creates images corresponding to the contents of display determined by the image control CPU 252, by using graphic data stored in the image ROM 258, stores the created images in the video RAM 260 temporarily, and supplies them with appropriate timing to the scale circuit 400 through the image control IC 262.

[Electrical Configuration of Lamp Control Circuit]

The lamp control circuit 300 is described below with reference to FIG. 9.

The lamp control circuit 300 comprises a sound source IC 302 for controlling sounds to be emitted from the speakers 46, a sound ROM 304 in which voice data is stored, a power amplifier 306 as an amplifier, and a lamp drive circuit 322 for driving the effect lamps 172.

[Electrical Configuration of Scale Circuit]

The scale circuit 400 is described below with reference to FIG. 11.

The scale circuit 400 comprises a signal conversion CPU 272, a signal conversion ROM 274, a video RAM 276, an IN port 278, and an OUT port 280.

The signal conversion CPU 272 receives an image signal created by the image control circuit 250 through the IN port 278, and converts the display form on the display device 30, and stores the image signals and the display form into the video RAM 276, according to the signal conversion sequence program stored in the signal conversion ROM 274.

The signal conversion CPU 272 also supplies the image data stored in the video RAM 276 to the display device 30 through the OUT port, as enlarged image signals suitable for the display device 30.

Specifically, the signal conversion CPU 272 converts an image signal of a display size such as a VGA size to an enlarged image signal of a larger display size such as an XGA size.

In this embodiment, image data of VGA display size is converted to image data of XGA display size by enlarging it every bit. However, the present invention is not limited thereto. It is also possible that image data of VGA display size are received and the received image data of VGA display size are merged and converted to single image data of XGA display size.

In this embodiment, an image signal is converted to an enlarged image signal representing XGA-type, horizontal 1024 bits, vertical 768 bits, 8-bit red data, 8-bit green data, and 8-bit blue data. However, in the present invention, any display method in which an image is displayed in a larger size may be applicable, and the type of conversion, the number of horizontal bits, the number of vertical bits, the number of bits of gradation for each color, etc. are not limited to ones mentioned above.

The signal conversion CPU 272 is designed so as to receive image signals supplied from the sub-control circuit 200 in a predetermined cycle, and if the signal conversion CPU 272 has not received any normal image signal in a predetermined cycle, it stores image data into the video RAM 276 so that a predetermined image is displayed.

In other words, the signal conversion CPU 272 determines whether an image signal supplied from the sub-control circuit 200 is normal, and when it determines that the image signal is not normal i.e. abnormal, it allows the display device 30 to display a predetermined image to keep the state of image to be displayed on the display device 30. For example, the signal conversion CPU 272 watches a synchronizing signal to be input, and when there is no synchronizing signal or the synchronizing signal is not a defined one, the signal conversion CPU 272 executes transmission control (so-called "white output" control) on the display device 30.

Furthermore, although the signal conversion CPU 272 is configured, as described above, so as to allow the display device to display a predetermined image, the signal conversion CPU 272 stores image data into the video RAM 276 so that a relatively high transparent image which allows a player to visually identify the reels 26L, 26C, and 26R is displayed.

In the signal conversion ROM 274, a communication sequence program for the communication between the signal conversion CPU 272 and the image control circuit 250, a sequence program for converting a received image signal to an enlarged image signal, and a communication sequence program for supplying the enlarged image signal to the display device 30 through the OUT port 280 are stored.

The IN port 278 has a function of receiving an image signal supplied from the image control circuit 250 to supply the image signal to the signal conversion CPU 272. Furthermore, the OUT port 280 supplies an enlarged image signal converted by the image signal conversion circuit 270 to the display device 30, thereby producing an image display effect.

In this embodiment, image signals supplied to the image signal conversion circuit 270 are produced by a low voltage differential signaling (LVDS) method. However, the present invention is not limited thereto, and may be produced by various types of signaling methods. For example, it is preferable that image signals are produced by a differential method such as a LVDS method so that image signals are not susceptible to noise and thereby images are displayed without deterioration.

Furthermore, in this embodiment, an image signal supplied to the image signal conversion circuit 270 is an image signal of VGA (Video Graphics Array) size, and is converted to an enlarged image signal of XGA (extended Graphics Array) size by the processing of the image signal conversion circuit 270. In this embodiment, image signals of VGA size are supplied to the image signal conversion circuit 270. However, the present invention is not limited thereto, and image signals of various sizes may be supplied to the image signal conversion circuit 270.

[Board Configuration of Display Device]

The electrical configuration of the display device 30 is described below with reference to FIG. 11.

Figure 11:
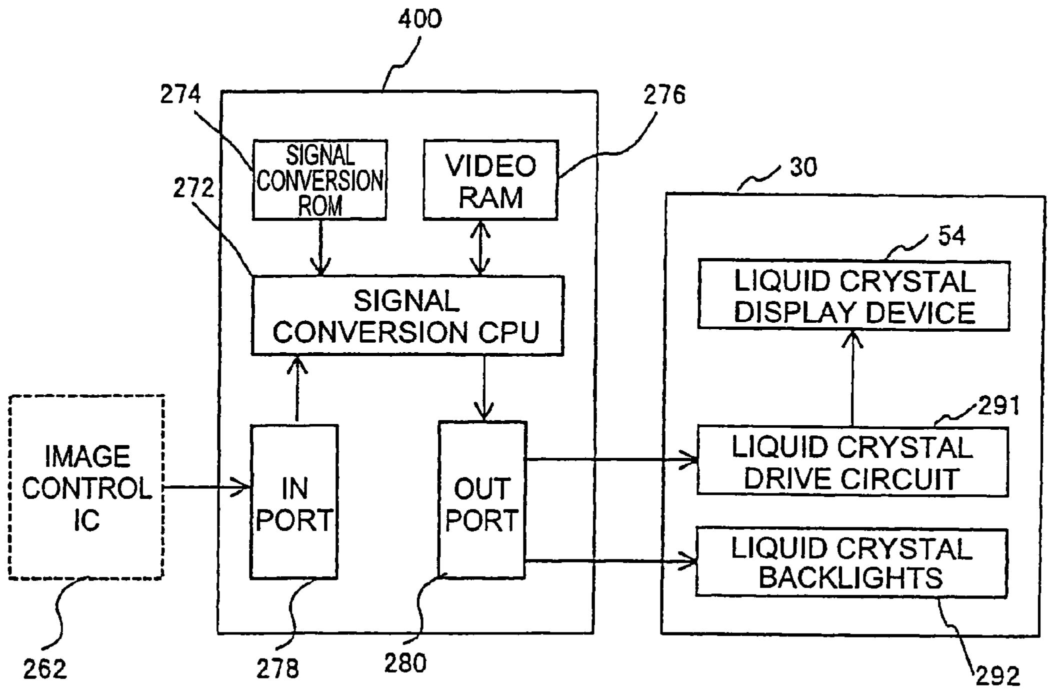

The display device 30 comprises, as shown in FIG. 11, a liquid crystal display device 54, a liquid crystal drive circuit 291, and liquid crystal backlights 292.

On the liquid crystal display device 54, various images are displayed based on the image signals supplied from the scale circuit 400 mentioned above.

The liquid crystal drive circuit 291 receives an image signal supplied from the scale circuit 400 mentioned above, and allows the liquid crystal display device 54 to display an image based on the image signal.

The liquid crystal backlights 292 illuminates the liquid crystal display device 54 at its back, thus causing the liquid crystal to display an image vividly.

[Configuration of Power Supply with Power Source Relay Board]

The electrical configuration of power supply with the power source device 79 is described below with reference to FIG. 12.

Figure 12:
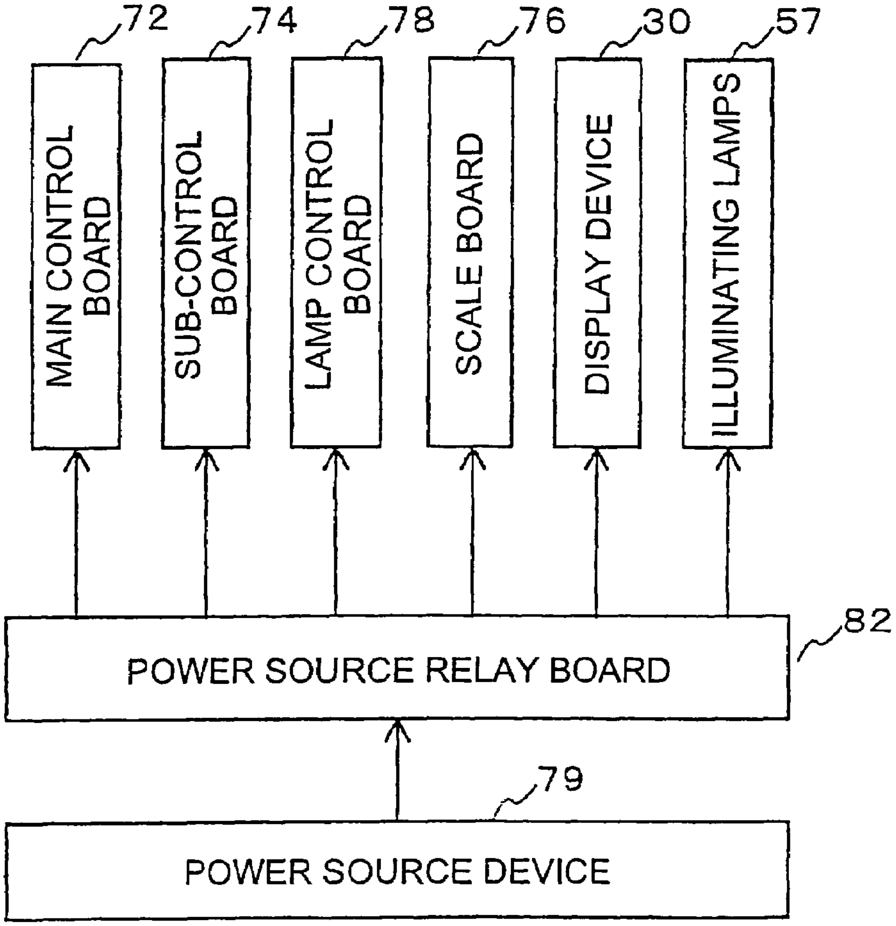

Electric power is supplied, as shown in FIG. 12, from the power source device 79 to the power source relay board 82, and then supplied to the main control board 72, the sub-control board 74, the lamp control board 78, the scale board 76, the display device 30, and the illuminating lamps 57 through respective connection cables for power supply (not shown).

In this embodiment, the display device 30 is provided in front of the reels 26L, 26C, and 26R so that the display device 30 is allowed to display a relatively transparent image. However, the present invention is not limited thereto. The display device 30 may not be provided in front of the reels 26L, 26C, and 26R. Furthermore, there is no problem if the display device 30 lacks a function of displaying a relatively transparent image.

The effects described in this specification are only the most suitable effects derived from the present invention, and the effects of the present invention are not limited to ones described in this specification.

According to the present invention, the light emitted from the light source units is guided to the symbols without being diffused by the reflection units, and thereby the symbols are illuminated more brightly than in a gaming machine having no reflection unit.

Although only some exemplary embodiments of this invention have been described in detail above, those skilled in the art will readily appreciated that many modifications are possible in the exemplary embodiments without materially departing from the novel teachings and advantages of this invention. Accordingly. all such modifications are intended to be included within the scope of this invention.

This application is related to co-pending U.S. patent applications entitled "GAME MACHINE" referred to as Ser. No. 10/697,942, "GAME MACHINE" referred as Ser. No. 10/697,946, "GAME MACHINE" referred to as Ser. No. 10/697,244, "GAME MACHINE" referred to as Ser. No. 10/697,441, "GAME MACHINE" referred to as Ser. No. 10/697,249, "GAME MACHINE" referred to as Ser. No. 10/697,004, "GAME MACHINE" referred to as Ser. No. 10/697,251, "GAME MACHINE" referred to as Ser. No. 10/697,254, "GAME MACHINE" referred to as Ser. No. 10/697,005, "GAME MACHINE" referred to as Ser. No. 10/697,006, "GAME MACHINE" referred to as Ser. No. 10/697,259, "GAME MACHINE" referred to as Ser. No. 10/697,007, "GAME MACHINE" referred to as Ser. No. 10/697,042, "GAME MACHINE" referred to as Ser. No. 10/697,158, "GAME MACHINE" referred to as Ser. No. 10/697,039, "GAME MACHINE" referred to as Ser. No. 10/697,157, "GAME MACHINE" referred to as Ser. No. 10/697,040, "GAME MACHINE" referred to as Ser. No. 10/697,041, "GAME MACHINE" referred to as Ser. No. 10/697,026, "GAME MACHINE" referred to Ser. No. 10/697,054, "GAME MACHINE" referred to as Ser. No. 10/697,082, "GAME MACHINE" referred to as Ser. No. 10/697,088, "GAME MACHINE" referred to as Ser. No. 10/697,080, "GAME MACHINE" referred to as Ser. No. 10/697,081, "GAME MACHINE" referred to as Ser. No. 10/697,027, "GAME MACHINE" referred to as Ser. No. 10/697,086, "GAME MACHINE" referred to as Ser. No. 10/697,237, "GAME MACHINE" referred to as Ser. No. 10/697,238, "GAME MACHINE" referred to as Ser. No. 10/697,947, "GAME MACHINE" referred to as Ser. No. 10/697,245, "GAME MACHINE" referred to as Ser. No. 10/697,246, "GAME MACHINE" referred to as Ser. No. 10/697,248, "GAME MACHINE" referred to as Ser. No. 10/697,084, "GAME MACHINE" referred to as Ser. No. 10/697,432, "GAME MACHINE" referred to as Ser. No. 10/697,085, "GAME MACHINE" referred to as Ser. No. 10/697,256, "GAME MACHINE" referred to as Ser. No. 10/697,281, "GAME MACHINE" referred to as Ser. No. 10/697,261, and "GAME MACHINE" referred to as Ser. No. 10/697,258, respectively, all the applications being filed on Oct. 31, 2003 herewith. The co-pending applications including specifications, drawings and claims are expressly incorporated herein by reference in their entirety.

What is claimed is:

1. A gaming machine comprising:

a cabinet;

at least one decoration panel disposed on the front of said cabinet;

a display device including a mask panel having a plurality of display windows provided therethrough, the display device mounted on the front of said cabinet and adjacent the at least one decoration panel, the mask panel defining an imaginary plane;

a plurality of rotary reels operative to rotate about a common axis of rotation and positioned in a juxtaposed manner inside the cabinet, each one of the plurality of rotary reels having a plurality of symbols disposed on respective outer peripheries thereof, forward most ones of the plurality of symbols being visible through respective ones of the display windows; and at least one light source unit disposed inside of said cabinet and behind the at least one decoration panel, the at least one light source unit extending longitudinally along and about a longitudinal axis and including an elongated illuminating lamp and an elongated reflection plate positioned adjacent the illuminating lamp, the illuminating lamp and the reflection plate extending parallel to one another and to the common axis of rotation, wherein the at least one decoration panel is illuminated by light illuminating from the illuminating lamp and the forward most ones of the plurality of symbols are illuminated by the light illuminating from the illuminating lamp and by light illuminating from the illuminating lamp reflected from the reflection plate, the at least one light source unit is disposed apart from the display windows and longitudinally contacts the imaginary plane, the illuminating lamp and the reflection plate are arranged so that the plurality of symbols are illuminated by light emitted from the illuminating lamp and by reflected light being light emitted from the illuminating lamp and reflected by the reflection plate and the at least one decoration panel is provided at least at either one of an upper side or a lower side of the display device and the elongated illuminating lamp directly illuminates the decoration panel from the inside of the gaming machine.

2. The gaming machine according to claim 1, wherein transparent liquid crystal device is provided in front of said plurality of rotary reels.

3. A gaming machine comprising:

a cabinet;

a display device having a mask panel formed with a plurality of display windows extending therethrough, the display device provided on the front of the cabinet, the mask panel defining an imaginary plane;

a first decoration panel and a second decoration panel disposed apart from one another on the front of the cabinet with the display device positioned therebetween and extending parallel to the imaginary plane;

a plurality of rotary reels operative to rotate about a common axis of rotation and positioned in a juxtaposed manner inside the cabinet, each one of the plurality of rotary reels having a plurality of symbols disposed on respective outer peripheries thereof, forward most ones of the plurality of symbols being visible through respective ones of the plurality of display windows;

a first light source unit disposed inside of the cabinet and behind the first decoration panel, the first light source unit extending longitudinally along and about a first longitudinal axis and including an elongated first illuminating lamp and an elongated first reflection plate positioned adjacent the first illuminating lamp such that the first decoration panel is illuminated by light illuminating from the first illuminating lamp and the forward most ones of the plurality of symbols are illuminated by the light illuminating from the first illuminating lamp and by light illuminating from the first illuminating lamp reflected from the first reflection plate, the first longitudinal axis extending parallel to the common axis of rotation; and a second light source unit disposed inside of the cabinet and behind the second decoration panel, the second light source unit extending longitudinally along and about a second longitudinal axis and including an elongated second illuminating lamp and an elongated second reflection plate positioned adjacent the second illuminating lamp, the second longitudinal axis extending parallel to the first longitudinal axis and the common axis of rotation, wherein the second decoration panel is illuminated by light illuminating from the second illuminating lamp and the forward most ones of the plurality of symbols are illuminated by the light illuminating from the second illuminating lamp and by light illuminating from the second illuminating lamp reflected from the second reflection plate, the mask panel is disposed between the first light source unit and the second light source unit with the first light source unit being disposed apart from the display windows and longitudinally contacting the imaginary plane and with the second light source unit being disposed apart from the display windows and longitudinally contacting the imaginary plane, and the first light source unit and the second light source unit are arranged so that the plurality of symbols are illuminated by light emitted by the first and second illuminating lamps and by reflected light being light emitted from respective ones of the first and second illuminating lamps and reflected by respective ones of the first and second reflection plates.

4. A gaming machine comprising:

a cabinet;

at least one decoration panel disposed on the front of the cabinet;

a display device including a mask panel formed with a plurality of display windows provided therethrough, the display device mounted on the front of said cabinet, the mask panel defining an imaginary plane;

a plurality of rotary reels, each of which has a plurality of symbols on an outer periphery thereof, said symbols being visible through the display windows, the plurality of rotary reels operative to rotate about a common axis of rotation and positioned in a juxtaposed manner inside the cabinet;

at least one light source unit for illuminating said at least one decoration panel from the inside of said cabinet, the at least one light source unit extending longitudinally along and about a first longitudinal axis, the first longitudinal axis extending parallel to the common axis of rotation; and at least one reflection unit for guiding the light emitted from the at least one light source unit, the at least one reflection unit disposed adjacent the at least one light source unit, extending along and about a second longitudinal axis, the second longitudinal axis extending and parallel to the first longitudinal axis and the common axis of rotation, wherein said at least one reflection unit is arranged to guide the light emitted from the at least one light source unit to illuminate said plurality of symbols provided on said rotary reels, the at least one light source unit and the at least one reflection unit is disposed apart from the display windows with the at least one light source disposed between the at least one reflection unit and the display windows and the at least one light source unit and the at least one reflection unit longitudinally contact the imaginary plane, and the at least one light source unit and the at least one reflection unit are arranged so that the plurality of symbols are illuminated by light emitted from the at least one light source unit and by reflected light being light emitted from the at least one light source and reflected by the at least one reflection unit.

5. A gaming machine according to claim 4, wherein said at least one light source unit is disposed between said rotary reels and said at least one reflection unit.

6. A gaming machine according to claim 4, wherein a part of the light emitted from the at least one light source unit directly illuminates the reels and a part of the remaining light is reflected by the at least one reflection unit to illuminate the reels.

7. A gaming machine according to claim 4, wherein the at least one light source unit further illuminates the reels, the at least one reflection unit is arranged at a position except for between the at least one light source unit and the at least one decoration panel, and where the at least one reflection unit does not block the light directly illuminated from the at least one light source unit to the at least one decoration panel and where the at least one reflection unit indirectly guides the light not directly illuminated to the reels.

* * * * *